United States Patent
Reiher

(10) Patent No.: US 8,135,000 B2
(45) Date of Patent: Mar. 13, 2012

(54) METHODS AND SYSTEMS FOR SELECTING A BUDDY FROM A BUDDY LIST AND FOR PLACING CALL TO A BUDDY

(75) Inventor: Eric Reiher, Longueuil (CA)

(73) Assignee: SabSe Technologies, Inc., Mountain View, CA (US)

( * ) Notice: Subject to any disclaimer, the term of this patent is extended or adjusted under 35 U.S.C. 154(b) by 1278 days.

(21) Appl. No.: 11/826,104

(22) Filed: Jul. 12, 2007

(65) Prior Publication Data

US 2008/0013699 A1    Jan. 17, 2008

Related U.S. Application Data

(60) Provisional application No. 60/807,287, filed on Jul. 13, 2006, provisional application No. 60/807,277, filed on Jul. 13, 2006.

(51) Int. Cl.
*H04L 12/66* (2006.01)
*H04M 11/00* (2006.01)
*G06F 15/16* (2006.01)

(52) U.S. Cl. .................. 370/352; 370/356; 379/90.01; 379/93.03; 709/204

(58) Field of Classification Search .......... 370/352–356, 370/389–466; 379/221–265, 88–90, 373–375; 709/238–250, 205–229; 726/2–7, 197–211; 455/422–455

See application file for complete search history.

(56) References Cited

U.S. PATENT DOCUMENTS

| 4,817,129 A | 3/1989 | Riskin |
| 5,181,238 A * | 1/1993 | Medamana et al. ....... 379/93.03 |
| 5,204,894 A | 4/1993 | Darden |
| 5,594,784 A | 1/1997 | Velius |
| 5,675,632 A | 10/1997 | Odaka et al. |
| 5,901,214 A | 5/1999 | Shaffer et al. |
| 6,404,876 B1 | 6/2002 | Smith et al. |
| 6,445,775 B1 | 9/2002 | Morganstein et al. |
| 6,760,580 B2 | 7/2004 | Robinson et al. |
| 6,791,974 B1 * | 9/2004 | Greenberg ................... 370/352 |
| 6,868,544 B2 * | 3/2005 | Dalal et al. ................... 719/318 |
| 6,937,715 B2 * | 8/2005 | Delaney .................. 379/265.09 |
| 7,065,186 B1 | 6/2006 | Myers et al. |
| 7,088,816 B2 * | 8/2006 | Donnelly ................. 379/373.01 |

(Continued)

FOREIGN PATENT DOCUMENTS

CA    2565919    11/2005

(Continued)

*Primary Examiner* — Man Phan

(74) *Attorney, Agent, or Firm* — Lathrop & Gage LLP

(57) ABSTRACT

A method selects a buddy with which a user wants to connect. The buddy has a buddy identification listed in a pre-identified group of Internet-accessible destinations. The user using a user telephone means to which is associated identification information. A call is initiated from the user telephone means to an Internet-enabled computing device and has associated thereto calling line identification (CLID) information. The CLID information is compared to the user telephone means identification information. The CLID information is validated using the comparison and upon positive validation, the user providing the buddy identification; consulting the pre-identified group of Internet-accessible destinations for a match between the buddy identification and one of the Internet-accessible destinations; and advising the user of a successful or unsuccessful match. Alternatively, a call is placed to a party which does not necessarily belong to a pre-identified group of Internet-accessible destinations.

19 Claims, 3 Drawing Sheets

U.S. PATENT DOCUMENTS

| | | |
|---|---|---|
| 7,127,046 B1 | 10/2006 | Smith et al. |
| 7,206,389 B1 | 4/2007 | Dumoulin et al. |
| 7,281,029 B2 * | 10/2007 | Rawat .......................... 709/204 |
| 7,634,800 B2 * | 12/2009 | Ide et al. ........................... 726/3 |
| 2002/0007462 A1 * | 1/2002 | Omata ........................ 713/202 |
| 2002/0154626 A1 * | 10/2002 | Ryu ............................. 370/352 |
| 2002/0196279 A1 * | 12/2002 | Bloomfield et al. .......... 345/749 |
| 2007/0281680 A1 * | 12/2007 | Raju et al. .................. 455/422.1 |
| 2008/0072299 A1 * | 3/2008 | Reiher ............................. 726/7 |

FOREIGN PATENT DOCUMENTS

| | | |
|---|---|---|
| CA | 2571754 | 1/2006 |

* cited by examiner

METHODS AND SYSTEMS FOR SELECTING A BUDDY FROM A BUDDY LIST AND FOR PLACING CALL TO A BUDDY

CROSS-REFERENCE TO RELATED APPLICATIONS

This patent application claims priority of the U.S. provisional Patent Application No. 60/807,287, entitled "Dial-by-Buddy" filed on Jul. 13, 2006; and of the U.S. provisional Patent Application No. 60/807,277, entitled "Auto-Login by Calling Line Identification (CLID)" filed on Jul. 13, 2006. The specifications and drawings of both applications are hereby incorporated by reference.

TECHNICAL FIELD

The description relates generally to telephone services. More specifically, the context is Internet telephone.

BACKGROUND OF THE ART

Currently, buddy lists are primarily used to facilitate communication from an Internet-enabled device. For example, one can also place a call to a buddy on a buddy list, which can be done by selecting the buddy in question and selecting (e.g., clicking, touching) an icon, which initiates the call from the Internet-enabled device. The device thus becomes a Voice over Internet Protocol (VoIP) endpoint for the telephone call. However, when the user does not have an Internet-enabled device, it is not conventionally possible to access the buddy list, let alone directly initiate telephone calls to a selected buddy on the buddy list.

Accordingly, there is a need for improved Internet telephone services.

SUMMARY

In one aspect, the present description provides a method for selecting a buddy with which a user wants to connect. The buddy having a buddy identification being listed in a pre-identified group of Internet-accessible destinations. The user using a user telephone means to which is associated identification information. The method comprises: initiating a call from the user telephone means to an Internet-enabled computing device, the call having associated thereto calling line identification (CLID) information; comparing the CLID information to the user telephone means identification information; validating the CLID information using the comparison upon positive validation, the user providing the buddy identification; consulting the pre-identified group of Internet-accessible destinations for a match between the buddy identification and one of the Internet-accessible destinations; and advising the user of a successful or unsuccessful match.

In a second aspect, the present description provides a method for placing a call between user telephone means and a buddy telephone means, the buddy telephone means being internet-enabled and being identifiable by coordinates, the user telephone means having associated thereto identification information, the method comprising: initiating a call from the user telephone means to an Internet-enabled computing device, the call having associated thereto calling line identification (CLID) information; comparing the CLID information to the user telephone means identification information; validating the CLID information using the comparison; upon positive validation, the user providing the coordinates of the buddy telephone means; and placing the call between the user telephone means and the buddy telephone means corresponding to the coordinates.

In a third aspect, the present description provides a system for selecting a buddy with which a user wants to connect, the buddy having a buddy identification, the user using a user telephone means to which is associated identification information, the buddy identification being listed in a pre-identified group of Internet-accessible destinations, the system comprising: an input for receiving and the buddy identification and calling line identification CLID information of a call from the user telephone means to an Internet-enabled computing device; a database for storing the user telephone means identification information and the pre-identified group of Internet-accessible destinations; and the Internet-enabled computing device for comparing the CLID information to user-specific information; for validating the CLID information using the comparison; upon positive validation, for receiving the buddy identification; consulting the pre-identified group of Internet-accessible destinations for a match with between the buddy identification and one of the Internet-accessible destinations; and for advising the user of a successful or unsuccessful match.

In a fourth aspect, the present description provides a system for placing a call between user telephone means and a buddy telephone means, the buddy telephone means being internet-enabled and being identifiable by coordinates, the user telephone means having associated thereto identification information, the system comprising: an input for receiving calling line identification CLID information of an initial call from the user telephone means to an Internet-enabled computing device, and the coordinates of the buddy telephone means; a database for storing the user telephone means identification information; and the Internet-enabled computing device for comparing the CLID information to user-specific information; for validating the CLID information using the comparison; upon positive validation, for receiving the coordinates of the buddy telephone means; and for placing the call between the user telephone means and the buddy telephone means corresponding to the coordinates.

Further details of these and other aspects will be apparent from the detailed description and figures included below.

DESCRIPTION OF THE DRAWINGS

Reference is now made to the accompanying Figures depicting aspects of the present description, in which.

DETAILED DESCRIPTION

Figure 1:
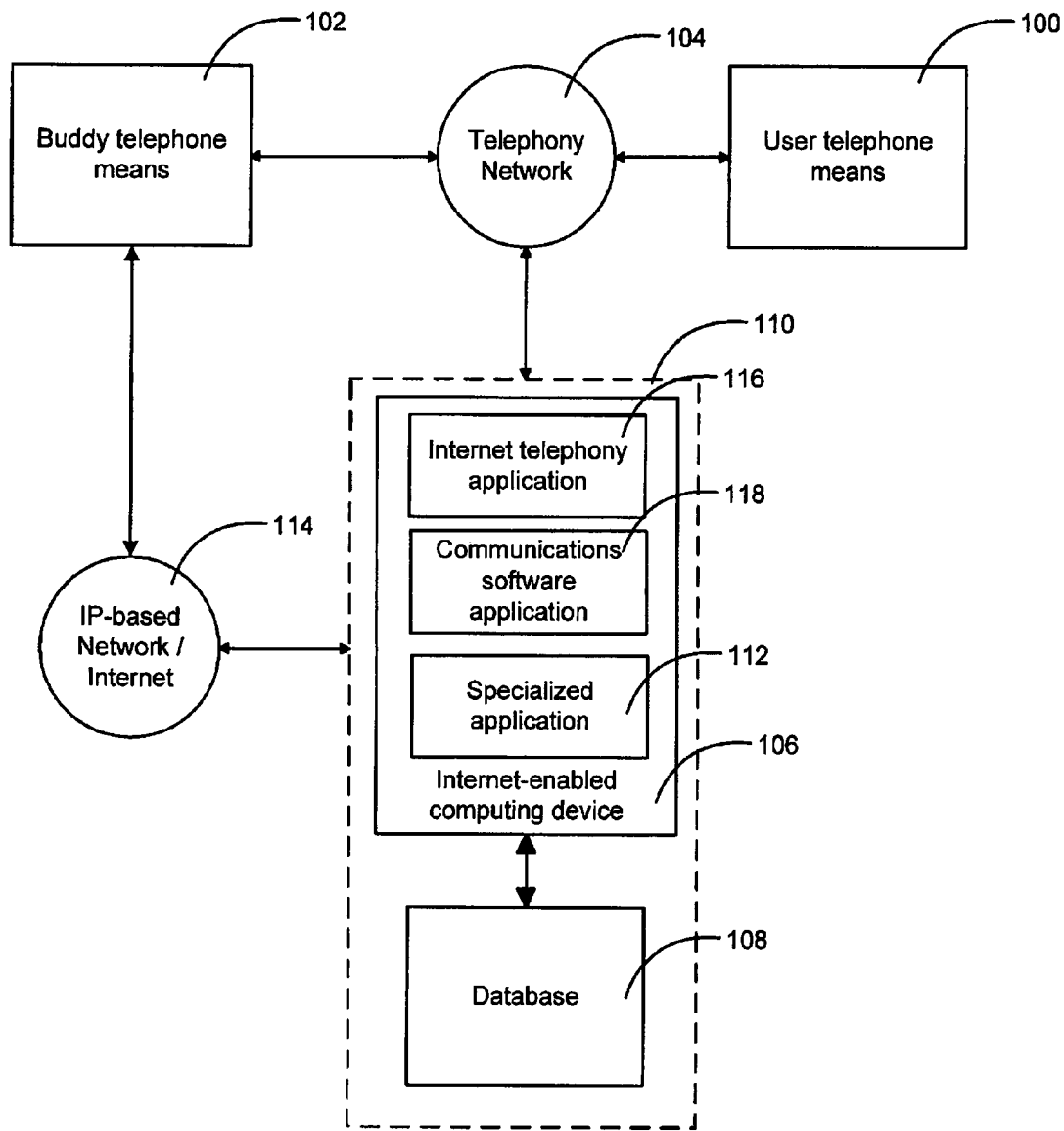
FIG. 1 is a block diagram providing an overview of the environment in which embodiments of the buddy selection and buddy calling systems and methods are implemented.

Turning to FIG. 1, there is shown user telephone means 100, buddy telephone means 102, and Internet-enabled computing device 106 that may be linked through telephony network 104. The buddy telephone means 102 is therefore reachable through the telephony network via a given number. Internet-enabled computing device 106 may also be linked to Internet Protocol (IP) based network 114 (e.g., the Internet). Furthermore, buddy telephone means 102 may also be linked to IP-based network 114. The links between the foregoing components can be wire-based or wireless. Telephony Network 104 can be any type of network adapted to communicate with user telephone means 100, buddy telephone means 102, and Internet-enabled computing device 106 such as a Public Switched Telephone Network (PSTN), an Internet Protocol (IP) network or any combination of the two. FIG. 1 further shows Internet-enabled computing device 106 in communication with database 108.

The buddy selection system 110 (also referred to herein as the system for selecting a buddy) comprises, in an embodiment, Internet-enabled computing device 106 and database 108. The person skilled in the art will understand that it is not essential that Internet-enabled computing device 106 and database 108 be embodied in a single machine or even in a single location. The components of system 110 can be in various machines or in various locations.

Internet-enabled computing device 106 is shown as hosting specialized application 112 which will be discussed in further detail below. Internet-enabled computing device 106 is also shown as hosting Internet telephony application 116 which allows Internet-enabled computing device 106 to act as a Internet-enabled telephone or a regular phone depending on which network it accesses.

Specialized application 112 allows a user to access information available on the user's computer (e.g., Internet-enabled computing device 106) or Internet 114, by dialling in from a phone (e.g., user telephone means 100) associated with a specific phone number. The present method and system use calling line identification (CLID) information associated with an incoming call to establish the identity of the user. The CLID Information can pertain to a telephone (also referred to herein as user telephone means 100) likely or expected to be used by the user, which can include a Public Switched Telephone Network (PSTN) phone or a mobile phone or a Voice over Internet Protocol (VoIP) phone.

The presently described method allows a user to query a specialized software application 112 using any phone in order to select a buddy to speak to without having to access the Internet. Of course, the method applies to any scenario where a user who has access to a regular phone (i.e., not necessarily Internet-enabled) wishes to place a call to someone in a pre-identified group of Internet-accessible destinations. The pre-identified group of internet-accessible destinations includes buddy-type contacts in Microsoft™ Outlook™, MSN™ Messenger™ and similar programs, or any other Internet buddy contacts. The destinations also include buddy contacts associated to a telephone number of any network-enabled telephone such as a PSTN telephone.

In an example, the specialized software application runs on a computer (Internet-enabled computing device 106) that can be the user's home computer or that can be a computer hosted elsewhere. One non-limiting example of specialized software application 112 can be installed together with Internet telephony software application 116 (e.g., Skype) and online communications software application 118 (e.g., IM/Messenger, email/Outlook,) on a users Internet-enabled computing device 106. After a call is received at the user's VoIP number (e.g., "Skype-in" when the Internet telephone software is Skype) from any phone and handled by the Internet telephony software application 116, the specialized software application 112 intervenes and recognizes that the user has himself dialled his own VoIP number (e.g., based on calling line identification (CLID)). An authentication step (not shown) may be provided to confirm the identity of the user and ensure that further access is permitted.

The specialized software application 112 then prompts the user to query a buddy by, e.g., entering the first three letters of a desired individual's first name or last name or nickname or account name or pseudonym. In the case of a touch-tone phone, queries can be effected using DTMF tones (e.g., suitable for PSTN phone) or short-message-service-type (SMS-type) messages (e.g., suitable for mobile phone), whereas in the case of a rotary dial phone or in fact any phone, queries can be effected using speech commands that are recognized by speech recognition software (not shown) installed on the computer or the phone.

The specialized software application 112 then consults the online communications software 118 to check if there is a matching name in the buddy list maintained by the online communications software 118. If the answer is positive, the specialized software application 112 sends the result (e.g., the matching buddy's first name or last name or nickname or account name or pseudonym) to the user for confirmation. For example, the result can be transmitted in the form of voice playback (e.g., text-to-speech or pre-recorded sounds that enunciate the matching name) or sound files (e.g., .wav/mpeg) or via SMS, among other possibilities. If there is more than one number at which the buddy can be called, or if more than one person with the same first name or last name or nickname or account name or pseudonym, the specialized software application 112 may announce all matches so the caller can choose the correct number or buddy.

The specialized software application 112 may also tell the user the corresponding code number for the desired buddy. This may be done using text-to-speech, for example. The caller then dials the code number to be connected to the desired buddy, or simply sends a confirmation command to indicate an intent to reach the desired buddy. Specifically, the specialized software application 112 consults database 108 (which can be maintained by the online communications software 118) to determine the telephone number associated with the desired buddy. To establish the call, in a specific non-limiting embodiment, the specialized software application 112 cooperates with the Internet telephone software to place a three-way conference call to patch in the desired buddy, with the user remaining on the line. Once the desired buddy has answered the call, the specialized software application 112 drops out of the call. Other ways of establishing a call are of course within the scope of the invention.

By announcing the code number, the user is "trained" to learn or note the code number for future reference. To this end, an option may be provided that the user simply enters the buddy's code number when first accessing the specialized software application 112, which bypasses the query procedure referred to above.

It is noted that in accordance with the present description, the user effects name dialling to call buddies based on the buddy list (as opposed to using name dialling to select extensions based on a Private Branch Exchange (PBX) directory). The specialized software application 112 can also initiate a callback when a desired buddy has been identified. Thus, the aforesaid three-way conference can be initiated by the specialized software application 112 by first contacting the user and then the desired buddy. In another variant of the call back feature, the callback is initiated earlier in the process, possibly even before the authentication step (callback to the number from which the user is calling), and the user proceeds to identify the buddy from there.

It is noted that the callback feature may have particular advantages when the user subscribes to an "unlimited Incoming calls" plan. Also, an option is provided where by the callback is made to a different number than the one from which the user is calling or from the number registered to the user.

In a variant of the above, the present method allows a user to query the specialized software application 112 using any phone in order to dial out using the Internet telephone software but without having to access to the Internet. In this variant, the called party does not necessarily belong to a pre-identified group of Internet-accessible destinations.

One non-limiting example of the specialized software application in accordance with this variant can be installed together with Internet telephone software (e.g., Skype) on a user's Internet-enabled computing device 106. However, there is no need to access a buddy list maintained by online communications software 118. After a call is received at the user's VoIP number (e.g., "Skype-in" when the Internet telephone software is Skype) from any phone and handled by the Internet telephony software application 116, the specialized software application 112 intervenes and recognizes that the user has himself dialled his own VoIP number. An authentication step may be provided to confirm the identity of the user and ensure that further access is permitted.

The specialized software application 112 then prompts the user to enter the coordinates of any Internet-enabled destination party (e.g., a SkypeOut number, also referred to herein as buddy telephone means 102). This could be in the form of dialling a phone number or providing an Internet address or resolvable name. In the case of a touch-tone phone, queries can be effected using DTMF tones (e.g., suitable for PSTN phone) or short-message-service-type (SMS-type) messages (e.g., suitable for mobile phone), whereas in the case of a rotary dial phone or in fact any phone, queries can be effected using speech commands that are recognized by speech recognition software installed on the computer or the phone.

The specialized software application 112 then cooperates with the Internet telephony software application 116 to place the call to the destination. To establish the call, in a specific non-limiting embodiment, the specialized software application 112 places a three-way conference call to patch in the destination while the user stays on the line. Once the call has been answered, the specialized software application 112 drops out of the call. Other ways of establishing a call are of course within the scope of the invention.

The specialized software application 112 can also initiate a callback after specifying the destination phone number. Thus, the aforesaid three-way conference can be initiated by the specialized software application 112 by first contacting the user and then the destination party. In another variant of the call back feature, the callback is initiated earlier in the process, possibly even before the authentication step (callback to the number from which the user is calling), and the user proceeds to dial the destination number from there.

It is noted that the callback feature may have particular advantages when the user subscribes to an "unlimited incoming calls" plan. Also, an option is provided where by the callback is made to a different number than the one from which the user is calling or from the number registered to the user.

It is noted that in accordance with this variant, a user who has a VoIP "in" number can dial it from any mobile (or receive a call back), and then use this connection to his own number/computer to further dial out over the Internet. This allows the fee structure of a wireless provider to be completely bypassed.

Figure 2:
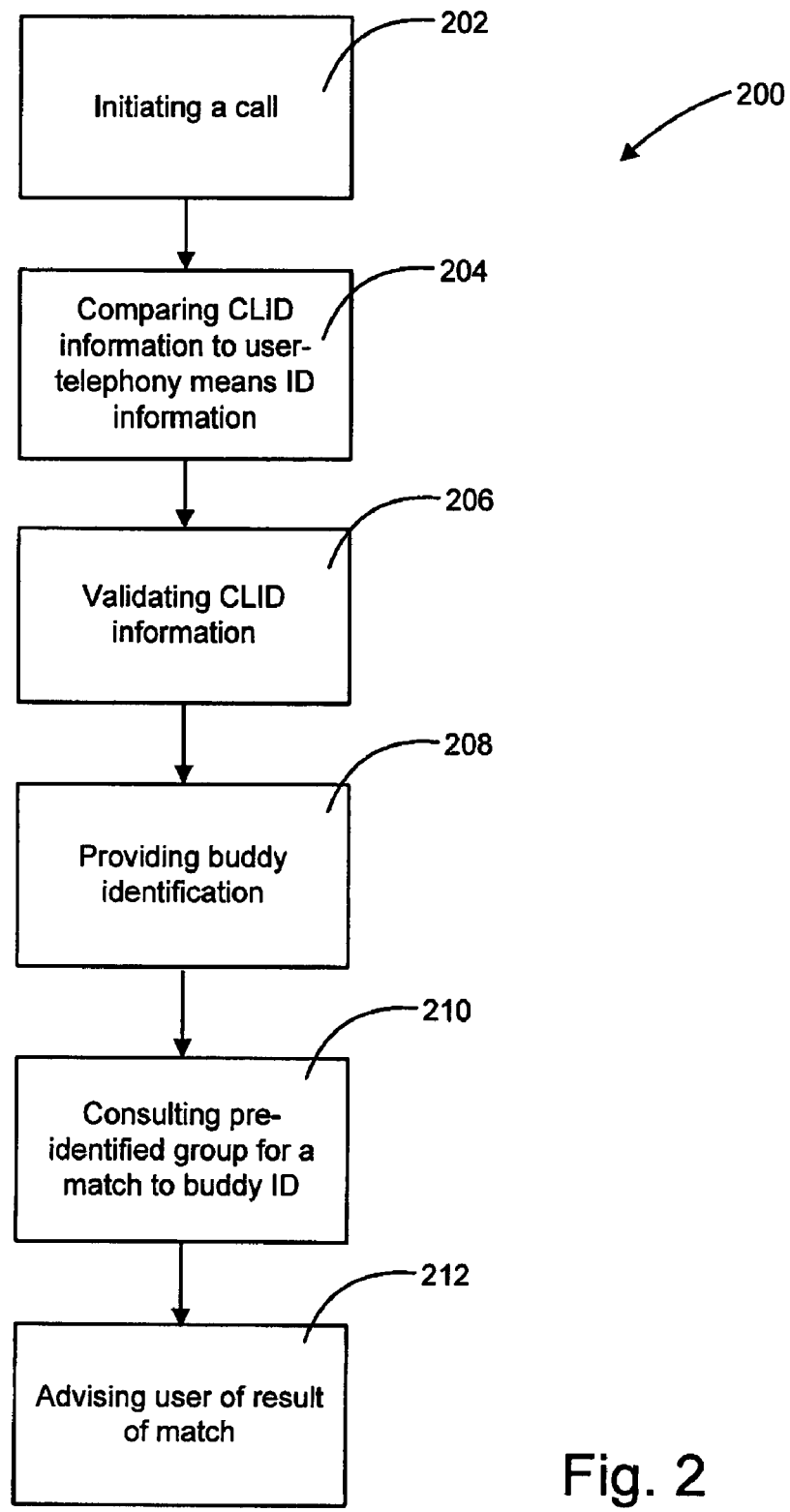
FIG. 2 is a flow chart illustrating an exemplary embodiment of a method for selecting a buddy from a buddy list.

Now turning to FIG. 2, there is shown an embodiment of method 200 for selecting a buddy with which a user wants to connect. The context is that a buddy has a buddy identification which is listed in a pre-identified group of Internet-accessible destinations, and the user uses a user telephone means to which is associated identification information. The user telephone means may or may not have Internet capabilities such as the capacity to connect with any network or combination of networks; PSTN, VoIP, or Skype for example.

Method 200 comprises, at step 202, initiating a call from the user telephone means to an Internet-enabled computing device. The call has associated thereto calling line identification (CLID) information. Then, at step 204, a comparison of the CLID information to the user telephone means identification information is performed. Step 206 validates the CLID information using the comparison. Upon positive validation, the user provides the buddy identification (step 208). Step 210 is for consulting the pre-identified group of Internet-accessible destinations for a match between the buddy identification and one of the Internet-accessible destinations. Finally, method 200 comprises advising the user of a successful or unsuccessful match (step 212).

Figure 3:
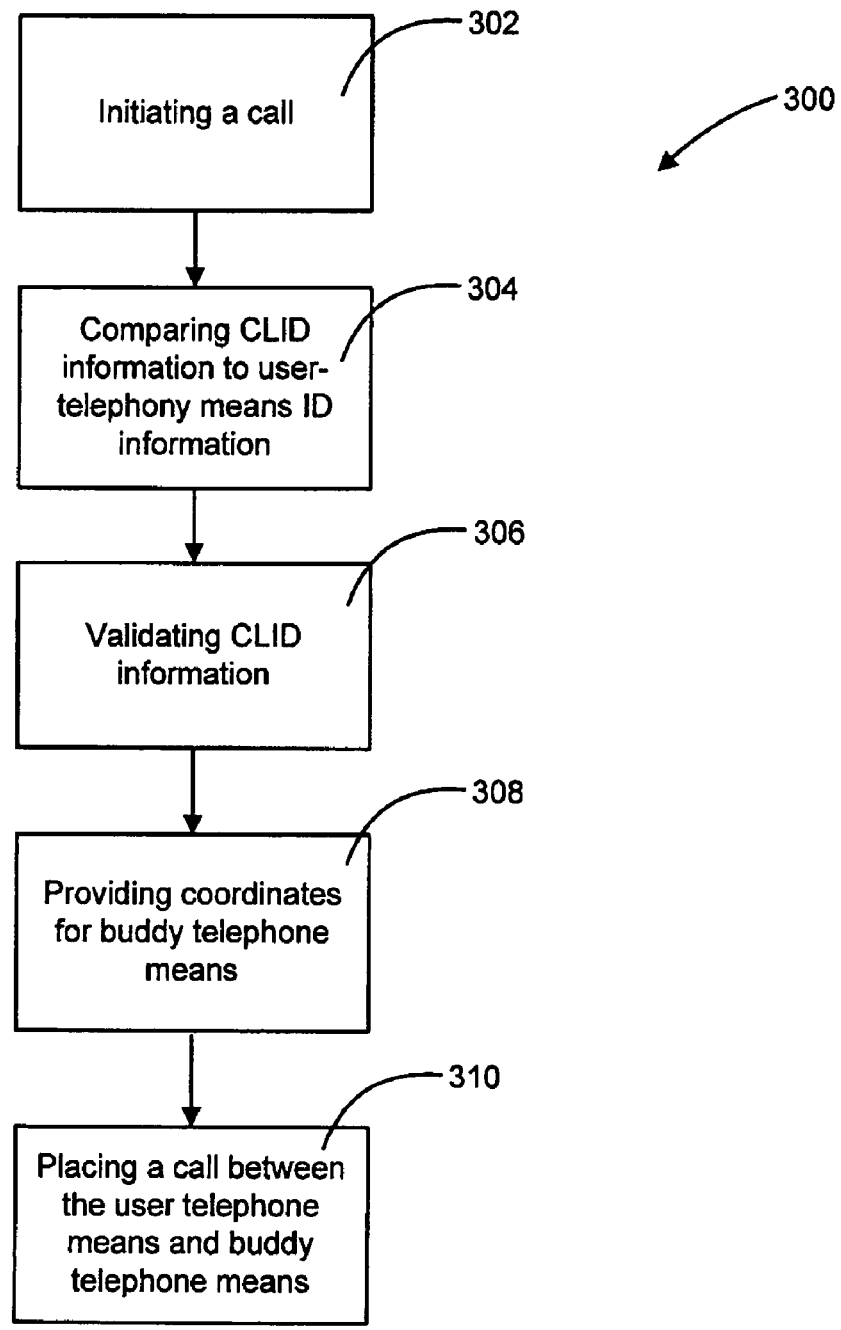
FIG. 3 is a flow chart illustrating an exemplary embodiment of a method for placing a call to a buddy.

Now turning to FIG. 3, there is shown an embodiment of method 300 for placing a call between user telephone means and a buddy telephone means. The context is that the buddy telephone means is internet-enabled and is identifiable by coordinates. Furthermore, the user telephone means has associated thereto identification information.

Method 300 comprises, at step 302, initiating a call from the user telephone means to an Internet-enabled computing device. The call has associated thereto calling line identification (CLID) information. Then, at step 304, a comparison of the CLID information to the user telephone means identification information is performed. Step 306, validates the CLID information using the comparison. Upon positive validation, the user provides the coordinates of the buddy telephone means (step 308). Finally, method 300 comprises placing the call between the user telephone means and the buddy telephone means corresponding to the coordinates (step 310).

The above description is meant to be exemplary only, and one skilled in the art will recognize that changes may be made to the embodiments described without department from the scope of the invention disclosed. Modifications which fall within the scope of the present invention will be apparent to those skilled in the art, in light of a review of this disclosure, and such modifications are intended to fall within the appended claims.

What is claimed is:

1. A method for determining contact information of a buddy of a user of a user telephone means having associated identification information, the method comprising:
   receiving, at an Internet-enabled computing device, an incoming call from the user telephone means;
   receiving, at the Internet-enabled computing device, calling line identification (CLID) information associated with the incoming call;
   comparing the CLID information to the user telephone means associated identification information;
   if the CLID matches the associated identification information of the user:
   receiving buddy identification of the buddy from the user;
   determining a match result based upon the buddy identification being listed in one of a group of pre-identified Internet-accessible destinations; and
   sending the match result to the user telephone means;
   wherein the buddy identification comprises at least one of:
   letters entered by the user using a keypad on the user telephone means;
   DTMF tones entered by the user using the keypad on the user telephone means;
   numbers entered by the user using the keypad on the user telephone means;

a short-message-service-type message entered by the user using a keypad on the user telephone means; and
speech entered by the user using the user telephone means.

2. The method of claim 1, further comprising:
placing an outgoing call to a buddy telephone means associated with the buddy; and
connecting the incoming call to the outgoing call to form a three-way call between the Internet connected computing device, the user, and the buddy.

3. The method of claim 2, wherein once the buddy telephone means answers the outgoing call, the Internet-enabled computing device drops out of the three-way call, thereby leaving a two-way connection between the user telephone means and the buddy telephone means.

4. The method of claim 2, wherein placing the three-way conference call comprises calling back one of: the user telephone means and another telephone means.

5. The method of claim 1, further comprising prompting the user to provide the buddy identification if the CLID matches the user telephone means identification information.

6. The method of claim 1, further comprising using the Internet-enabled computing device to advise the user of a code to provide to identify the buddy.

7. The method of claim 1, further comprising, prior to receiving the incoming call, the user registering information identifying the user telephone means in a database accessible to the Internet-enabled computing device.

8. The method of claim 7, wherein the registering further comprises registering an association between the user and one or more specific telephone numbers that the user expects to use.

9. The method of claim 7, wherein the registering further comprises registering authentication credentials.

10. The method of claim 9, further comprising, prior to the validation, performing an authentication using the authentication credentials to confirm the identity of the user.

11. A method for placing a call between user telephone means and a buddy telephone means, the buddy telephone means being Internet-enabled and being identifiable by coordinates, the user telephone means having associated thereto identification information, the method comprising:
receiving, at an Internet-enabled computing device, a call from the user telephone means, the call having associated thereto calling line identification (CLID) information;
comparing the CLID information to the user telephone means identification information;
validating the CLID information using the comparison;
upon positive validation, receiving from the user the coordinates of the buddy telephone means; and
placing the call between the user telephone means and the buddy telephone means corresponding to the coordinates;
wherein the coordinates are received in the form of at least one of: letters related to the coordinates and entered using the keypad on the user telephone means, DTMF tones related to the coordinates and entered using the keypad on the user telephone means, numbers related to the coordinates and entered using the keypad on the user telephone means, a short-message-service-type message related to the coordinates and entered using the keypad on the user telephone means, and speech commands related to the coordinates and entered using the user telephone means.

12. A buddy selection system for determining contact information of a buddy of a user of the buddy selection system, the system comprising:
a database for storing a pre-identified group of Internet-accessible destinations; and
an Internet-enabled computing device communicatively coupled with the database and comprising:
an Internet telephony application for receiving a call from a user telephone means of the user, the call having calling line identification (CLID) information;
a specialized software application for intervening in the call when the CLID information indicates that the call is from the user telephone means, and for receiving buddy identification from the user via the user telephone means; and
a communication software application for searching for the buddy identification within the pre-identified group of Internet-accessible destinations to determine a search result;
wherein the specialized software application sends the search result to the user telephone means and cooperates with the Internet telephone software to create an outgoing call to-a buddy telephone means associated with the buddy upon successful match between the buddy identification and one of the Internet-accessible destinations.

13. The system of claim 12, wherein the Internet-enabled computing device further comprises a prompting device for prompting the user to provide the buddy identification upon positive validation.

14. The system of claim 12, further comprising an output device for advising the user of a code to provide to identify the buddy.

15. The system of claim 12, wherein the Internet-enabled computing device comprises an input for receiving user registration information prior to receiving the call, the user registration information identifying the user telephone means in the database.

16. The system of claim 15, wherein the registration information comprises an association between the user and one or more specific telephone numbers that the user expects to use.

17. The system of claim 15, wherein the registration information further comprises authentication credentials.

18. The system of claim 14, further comprising an authenticating device for performing an authentication using the authentication credentials to confirm an identity of the user prior to the validation.

19. A system for placing a call between user telephone means and a buddy telephone means, the buddy telephone means being Internet-enabled and being identifiable by coordinates, the user telephone means having associated thereto identification information, the system comprising:
an input for receiving calling line identification CLID information of an initial call from the user telephone means to an Internet-enabled computing device, and the coordinates of the buddy telephone means;
a database for storing the user telephone means identification information; and
the Internet-enabled computing device for comparing the CLID information to user-specific information; for validating the CLID information using the comparison; upon positive validation, for receiving the coordinates of the buddy telephone means; and for placing the call between the user telephone means and the buddy telephone means corresponding to the coordinates;
wherein the coordinates are received in the form of at least one of: letters related to the coordinates and entered using the keypad on the user telephone means, DTMF tones related to the coordinates and entered using the keypad on the user telephone means, numbers related to the coordinates and entered using the keypad on the user telephone means, a short-message-service-type message related to the coordinates and entered using the keypad on the user telephone means, and speech commands related to the coordinates and entered using the user telephone means.

* * * * *